(12) United States Patent
Barson

(10) Patent No.: US 10,818,150 B2
(45) Date of Patent: Oct. 27, 2020

(54) SYSTEMS AND METHODS FOR CONTROLLING ILLUMINATION COVERAGE OF VISUAL ALARM DEVICES

(71) Applicant: Honeywell International Inc., Morris Plains, NJ (US)

(72) Inventor: Michael Barson, Nuneaton (GB)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/267,762

(22) Filed: Feb. 5, 2019

(65) Prior Publication Data
US 2020/0250941 A1    Aug. 6, 2020

(51) Int. Cl.
| | |
|---|---|
| G08B 5/00 | (2006.01) |
| G08B 5/36 | (2006.01) |
| H05B 45/10 | (2020.01) |
| H05B 45/44 | (2020.01) |
| H05B 33/08 | (2020.01) |
| G08B 5/38 | (2006.01) |

(52) U.S. Cl.
CPC ............. *G08B 5/36* (2013.01); *G08B 5/00* (2013.01); *H05B 45/10* (2020.01); *H05B 45/44* (2020.01); *G08B 5/38* (2013.01); *H05B 33/08* (2013.01)

(58) Field of Classification Search
CPC ........ G08B 5/38; G08B 5/00; H05B 33/0896; H05B 33/0803; H05B 33/0806; H05B 33/0842; H05B 33/0845; H05B 33/0848; H05B 33/0854; H05B 33/0857
See application file for complete search history.

(56) References Cited

U.S. PATENT DOCUMENTS

| | | | | |
|---|---|---|---|---|
| 10,440,786 | B1* | 10/2019 | Stoegner | ............ H05B 33/0887 |
| 2007/0188425 | A1* | 8/2007 | Saccomanno | .......... H05B 45/48 345/82 |
| 2009/0267540 | A1* | 10/2009 | Chemel | ................. H05B 45/10 315/297 |
| 2013/0307423 | A1* | 11/2013 | Lee | ...................... H05B 33/083 315/186 |

(Continued)

FOREIGN PATENT DOCUMENTS

| | | |
|---|---|---|
| EP | 2 858 047 A1 | 4/2015 |
| EP | 2 942 763 A1 | 11/2015 |
| EP | 3 079 130 A1 | 10/2016 |

*Primary Examiner* — Benyam Haile
(74) *Attorney, Agent, or Firm* — Brooks, Cameron & Huebsch, PLLC

(57) ABSTRACT

Systems and methods for controlling a luminous intensity distribution of a visual alarm device are provided that include a processor transmitting a first signal to a current source and transmitting a second signal to a gate of a transistor. Responsive to receiving the first signal, the current source can transmit current to LEDs connected in series with the current source. Responsive to receiving the second signal, the transistor can block the current from flowing from a source of the transistor to a drain of the transistor, thereby channeling the current to a subset of the LEDs connected in parallel with the transistor. Responsive to failing to receive the second signal, the transistor can allow the current to flow from the source of the transistor to the drain of the transistor, thereby channeling the current away from the subset of the LEDs connected in parallel with the transistor.

19 Claims, 7 Drawing Sheets

(56) References Cited

U.S. PATENT DOCUMENTS

2014/0320023 A1* 10/2014 Cannon ................ H05B 45/10
                                                                                    315/153
2017/0243450 A1    8/2017 Keller et al.

* cited by examiner

SYSTEMS AND METHODS FOR CONTROLLING ILLUMINATION COVERAGE OF VISUAL ALARM DEVICES

FIELD

The present invention relates generally to alarm devices. More particularly, the present invention relates to visual alarm devices.

BACKGROUND

Protection systems are known to detect threats within a protected area, and such threats can include events that represent a risk to human safety or a risk to assets.

Protection systems typically include one or more sensors that can detect the threats within the protected area. For example, smoke, motion, and/or intrusion sensors can be distributed throughout the protected area in order to detect the threats. Furthermore, protection systems typically include notification appliances, such as sounders and visual alarm devices (e.g. strobe lights), to provide an audible or visual notification when the threats are detected.

Known visual alarm devices are inflexible in design. More specifically, all known visual alarm devices cannot change their luminous intensity distribution (illumination shape), but merely their effective lumen output (effective intensity). As such, known visual alarm devices generally emit inefficient illumination shapes for the area and or height of a particular room in which the visual alarm devices are mounted. In addition the mounting locations of the visual alarm devices (e.g. wall vs. ceiling) makes a huge difference to the illumination shape required. For example EN54-23 requires that a wall mounting visual alarm devices produces a cuboid illumination shape, while a ceiling mounted visual alarm device must produce a cylindrical illumination shape. Clearly that same device used for both wall mounting and ceiling mounting would have an extremely poor efficiency.

Alarm system designers generally seek to remove these inefficiencies in strobe light emission because known visual alarm devices require a large proportion of an alarm system's output power, which causes excessive voltage drops in long cable runs. For example, alarm system designers have designed numerous models of visual alarm devices, each with different optics and coverage ratings for different room sizes, mounting heights, mounting locations and for different standards. However, providing numerous models can be impractical and expensive to maintain. As such, there is a need for a flexible and configurable visual alarm device.

DETAILED DESCRIPTION

Figure 1:
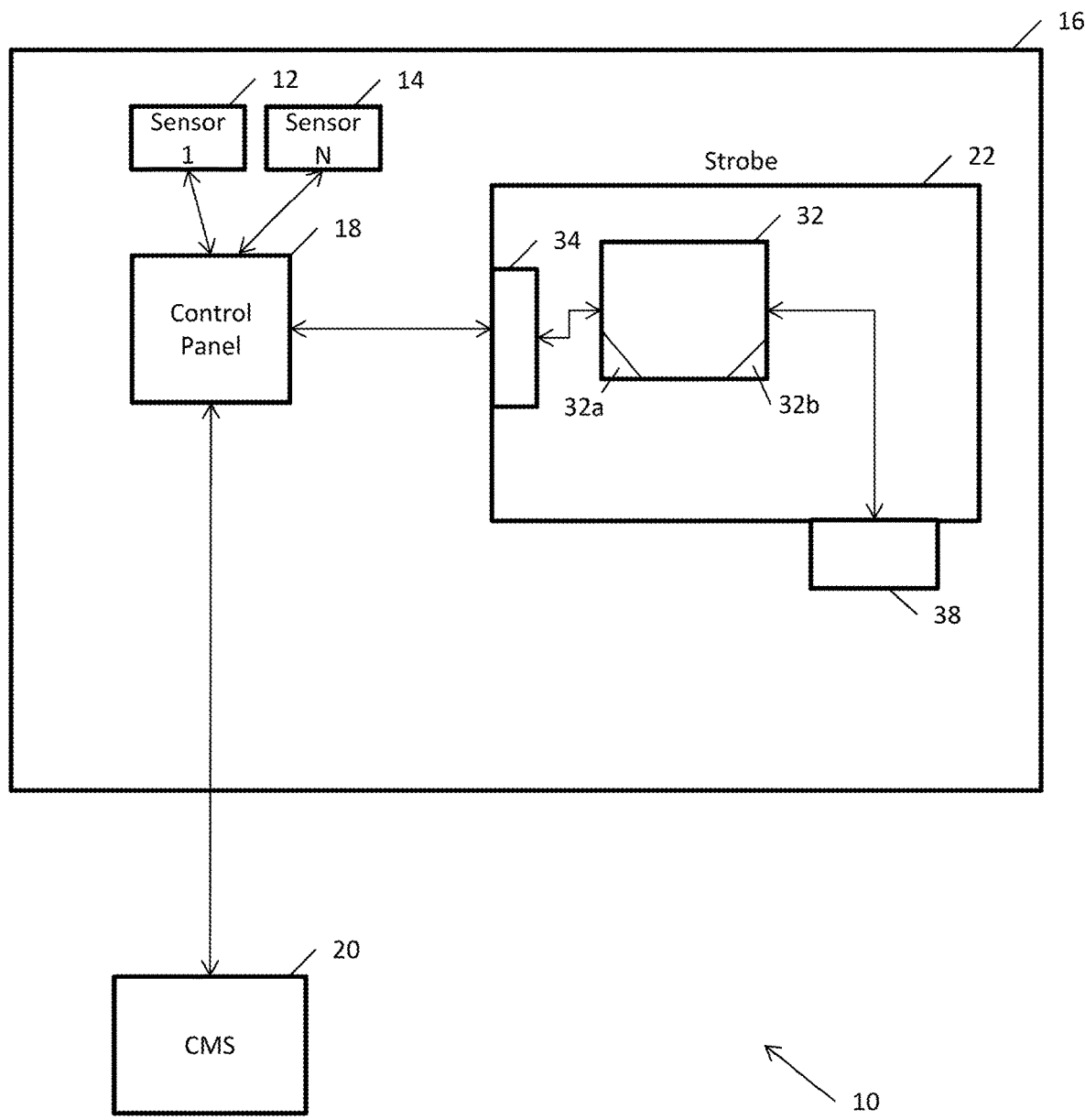
FIG. 1 is a block diagram of a protection system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for controlling a luminous intensity distribution of a visual alarm device. For example, the visual alarm device can include a microcontroller coupled to circuitry that controls activation and a luminous intensity of one or more light emitting diodes (LEDs) in the visual alarm device. Additionally or alternatively, the visual alarm device can include software that controls operation of the microcontroller and that is configured to account for a mounting height and a coverage area of the visual alarm device (e.g. a size and a shape of a room in which one or more visual alarm devices are mounted).

In some embodiments, the visual alarm device can include a circuit, and the circuit can include a switch-mode current source connected in series with the LEDs, each of which may be formed in a respective LED chain. Additionally or alternatively, in some embodiments, the circuit can include a transistor connected in parallel with a subset of the LEDs, and the transistor can selectively activate or deactivate the subset of the LEDs. Additionally or alternatively, the visual alarm device can include a plurality of circuits with each of the plurality of circuits including a respective current source, a respective plurality of LEDs, and a respective transistor. In any embodiment, the circuit(s) can control an amount of current supplied to the LEDs and a number of the LEDs activated, thereby allowing the visual alarm device to control the luminous intensity distribution of the visual alarm device.

According to exemplary embodiments, the number of the LEDs or LED chains included in the visual alarm device may vary. However, the visual alarm device can have more flexibility when more of the LEDs or the LED chains are included in the visual alarm device.

In some embodiments, the luminous intensity distribution may correspond to the particular coverage volume of a room. In other words the mounting height and the coverage area of the visual alarm device corresponds to that particular room size. Or in a very large room, the coverage volume of many visual alarm devices together may correspond to that large room volume.

FIG. 1 is a block diagram of a protection system 10 in accordance with disclosed embodiments. The protection system 10 can include one or more sensors 12, 14 that can monitor a protected area 16 for threats, and in some embodiments, the sensors 12, 14 can include intrusion, camera, motion, fire, smoke, and gas detectors. The sensors 12, 14 can communicate with a control panel 18, and the control panel 18 can monitor for activation of the sensors 12, 14.

In some embodiments, the control panel 18 can send an alarm message to a central monitoring station 20 upon the activation of one of the sensors 12, 14, and the central monitoring station 20 may respond by summoning the appropriate help. For example, if the one of the sensors 12, 14 activated detects a fire, then the central monitoring station 20 may summon a local fire department. Alternatively, if the one of the sensors 12, 14 activated detects an intrusion, then the central monitoring station 20 may summon the police.

In addition to sending the alarm message to the central monitoring station 20, the control panel 18 can send an activation message to a visual alarm device 22 located in the protected area 16. Responsive to the activation message, the visual alarm device 22 can activate a notification device, such as a strobe or a sounder, to inform occupants of the protected area 16 about an emergency event.

The visual alarm device 22 can include control circuitry 32, which can include a programmable processor 32a and executable control software 32b as would be understood by one of ordinary skill in the art. The executable control software 32b can be stored on a transitory or non-transitory computer readable medium including non-volatile memory with user programmable configuration data, which can define the coverage and operation of the visual alarm device. In some embodiments, the control circuitry 32, the programmable processor 32a, and the executable control software 32b can execute and control some of the methods disclosed herein.

The visual alarm device 22 can also include a transceiver device 34 and a flashing light source 38, which, in some embodiments, can include a plurality of LEDs in a plurality of LED chains. In some embodiments, the transceiver device 34 can receive data (e.g. the activation message) from the control panel 18 and relay the data to the control circuitry 32, and in some embodiments, the flashing light source 38 can be part of the control circuitry 32 or activated in response to commands from the control circuitry 32. Although not illustrated in FIG. 1, the visual alarm device 22 can also include a laser measuring device or other measuring device to identify a distance to an illumination surface or surfaces. In some embodiments, the laser measuring device can also measure a volume of a room in which the visual alarm device 22 is mounted.

Figure 2:
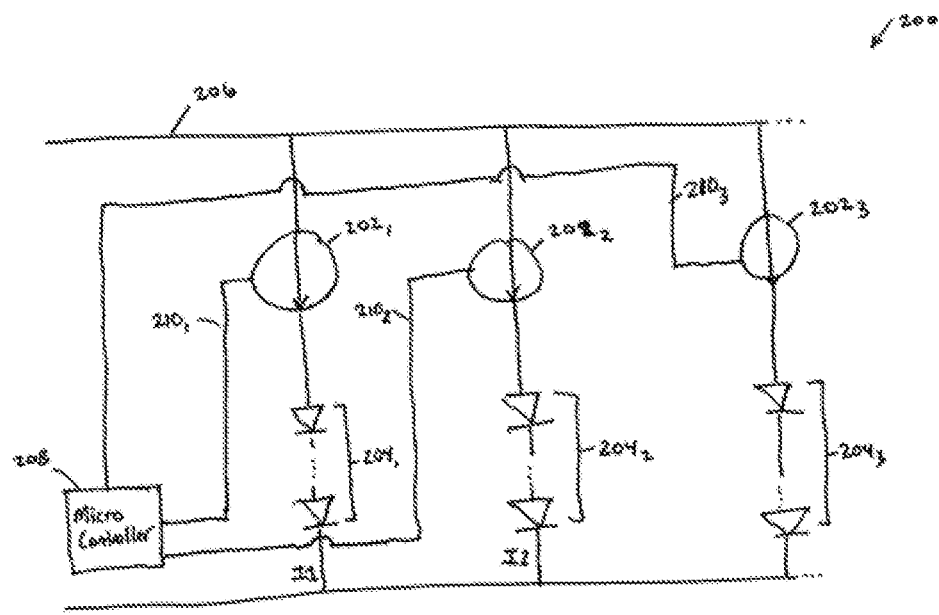
FIG. 2 is a circuit diagram of a visual alarm device in accordance with disclosed embodiments.

FIG. 2 is a circuit diagram of circuitry 200 (e.g. the control circuitry 32) of a visual alarm device (e.g. the visual alarm device 22) in accordance with disclosed embodiments. As seen in FIG. 2, the circuitry 200 can include one or more current sources $202_1$, $202_2$, $202_3$, one or more LED chains $204_1$, $204_2$, $204_3$, and a microcontroller 208. In some embodiments, each of the LED chains $204_1$, $204_2$, $204_3$ can include one or more LEDs. Furthermore, in some embodiments, each of the current sources $202_1$, $202_2$, $202_3$ can be connected in series with a respective one of the LED chains $204_1$, $204_2$, $204_3$, each of the current sources $202_1$, $202_2$, $202_3$ can be connected in parallel with one another, and each of the LED chains $204_1$, $204_2$, $204_3$ can be connected in parallel with one another.

In some embodiments, a supply rail 206 may drive each of the current sources $202_1$, $202_2$, $202_3$, and in some embodiments, the supply rail 206 can include an energy store, a battery, or a super-capacitor.

In some embodiments, the current sources $202_1$, $202_2$, $202_3$ can be controllable and can include boost converters, buck converters, or buck-boost converters. For example, the microcontroller 208 (e.g. the programmable processor 32a) may transmit control signals on one or more lines $210_1$, $210_2$, $201_3$ to selectively instruct the current sources $202_1$, $202_2$, $202_3$ to transmit output currents $I_1$, $I_2$, $I_3$ to the LED chains $204_1$, $204_2$, $204_3$. In this regard, the current sources $202_1$, $202_2$, $202_3$ can be switch-mode current sources that can be activated to transmit the output currents $I_1$, $I_2$, $I_3$ to the LED chains $204_1$, $204_2$, $204_3$ when the control signals are transmitted on the lines $210_1$, $210_2$, $210_3$ (e.g. by receiving either a high voltage signal or a low voltage signal). Upon receiving the output currents $I_1$, $I_2$, $I_3$, the LED chains $204_1$, $204_2$, $204_3$ can illuminate in accordance with amounts of the output currents $I_1$, $I_2$, $I_3$ transmitted. The control signals transmitted on the lines $210_1$, $210_2$, $210_3$ can also identify the amounts of the output currents $I_1$, $I_2$, $I_3$ for the current sources $202_1$, $202_2$, $202_3$ to transmit, thereby controlling how bright the LED chains $204_1$, $204_2$, $204_3$ illuminate. In some embodiments, the control signals on the lines $210_1$, $210_2$, $210_3$ can be pulse-width modulated signals.

In some embodiments, each of the LED chains $204_1$, $204_2$, $204_3$ can include a respective plurality of LEDs, and the respective plurality of LEDs in each of the LED chains $204_1$, $204_2$, $204_3$ can be evenly distributed in a circle to form rotational symmetry. For example, if six LEDs are included in a first of the LED chains $204_1$, then each of the six LEDs can be spaced 60° apart around the circle.

Figure 3A:
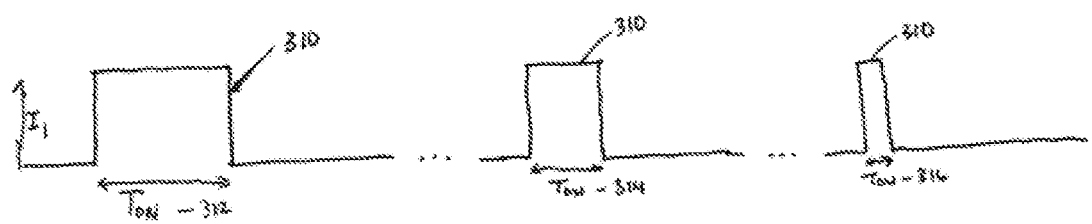
FIG. 3A is a pulse timing diagram in accordance with disclosed embodiments.
Figure 3B:
FIG. 3B is a pulse timing diagram in accordance with disclosed embodiments.

FIGS. 3A-3B are pulse timing diagrams in accordance with disclosed embodiments and show how the output currents $I_1$, $I_2$, $I_3$ from the LED chains $204_1$, $204_2$, $204_3$ can be illustrated in waveforms.

As seen in FIG. 3A, a first of the output currents $I_1$ from the first of the LED chains $204_1$ may have a peak current 310 that is equal for each pulse, but have different pulse widths ($T_{on}$) 312, 314, 316. For example, a first of the pulse widths 312 can be relatively longer than a second of the pulse widths 314, and the second of the pulse widths 314 can be relatively longer than a third of the pulse widths 316. By varying the pulse widths 312, 314, 316 of the first of the output currents $I_1$ from the first of the LED chains $204_1$, the microcontroller 208 can vary a luminous intensity of the first of the LED chains $204_1$.

As seen in FIG. 3B, a second of the output currents $I_2$ from a second of the LED chains $204_2$ can vary both in peak currents 318, 320, 322 and in pulse widths ($T_{on}$) 312, 314, 316. For example, a first of the peak currents 318 can be relatively lower than a second of the peak currents 320, and the second of the peak currents 320 may be relatively lower than a third of the peak currents 322. The pulse widths 312, 314, 316 may be equal to the pulse widths 312, 314, 316 for the first of the output currents $I_1$ so that all LEDs in the first of the LED chains $204_1$ and the second of the LED chains $204_2$ flash synchronously. By varying the pulse widths 312, 314, 316 and the peak currents 318, 320, 322 of the second of the output currents $I_2$ from the second of the LED chains $204_2$, the microcontroller 208 can vary the luminous intensity of the second of the LED chains $204_2$ both in duty cycle and intensity.

Figure 3C:
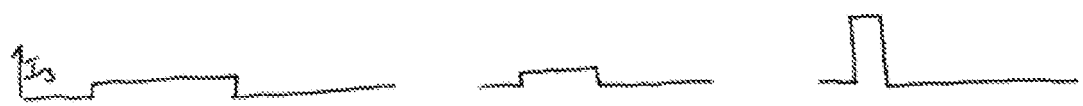
FIG. 3C is a pulse timing diagram in accordance with disclosed embodiments.

As seen in FIG. 3C, a third of the output currents $I_3$ from a third of the LED chains $204_3$ can vary in a manner similar to how the second of the output currents $I_2$ from the second of the LED chains $204_2$ varies.

Figure 4:
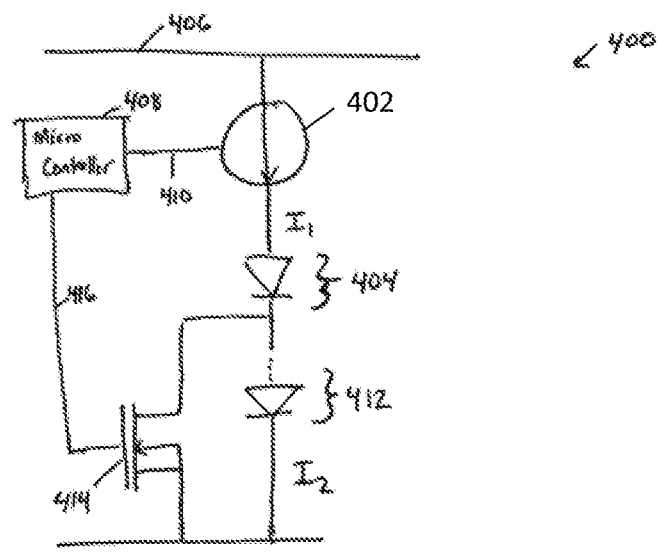
FIG. 4 is a circuit diagram of a visual alarm device in accordance with disclosed embodiments.

FIG. 4 is a circuit diagram of circuitry 400 (e.g. the control circuitry 32) of a visual alarm device (e.g. the visual alarm device 22) in accordance with disclosed embodiments. As seen in FIG. 4, the circuitry 400 can include a current source 402, a first LED 404, a second LED 412, a transistor 414, and a microcontroller 408 such that the current source 202, the first LED 404, and the second LED 412 can be connected in series, and the transistor 414 can be connected in parallel with the second LED 412. In some embodiments, each of the first and second LEDs 404, 412 may include one or more LEDs, and in some embodiments, the transistor 414 can be a MOSFET transistor.

In some embodiments, a supply rail 406 may drive the current source 402, and the microcontroller 408 can transmit a first input signal on a first line 410 to selectively instruct the current source 402 to transmit current $I_1$ to the first LED 404 and the second LED 412.

Furthermore, the microcontroller 408 can transmit a second input signal on a second line 416 to a gate of the transistor 414 to control the transistor 414. For example, when the microcontroller 408 transmits the second input signal on the second line 416 to activate the transistor 414, the transistor 414 can substantially block the current $I_1$ from flowing from a source of the transistor 414 to a drain of the transistor 414, thereby sending the current $I_1$ to the second LED 412 for illumination of the second LED 412. However, when microcontroller 408 transmits the second input signal on the second line 416 to deactivate the transistor (or refrains from transmitting the second input signal on the second line 416), the transistor 414 can allow the current $I_1$ to flow from the source of the transistor to the drain of the transistor 414, thereby bypassing and preventing the current $I_1$ from reaching the second LED 410, and thereby deactivating the second LED 410. Accordingly, the first LED 402 can be activated whenever the current source 402 transmits the current $I_1$, but the microcontroller 408 can control how many LEDs in a chain are activated or deactivated via the transistor 414.

In some embodiments, the microcontroller 408 can also control how bright the first LED 404 and the second LED 410 illuminate. For example, upon receiving the current $I_1$, the first LED 404 and the second LED 410 can illuminate in accordance with an amount of the current $I_1$ received. In this regard, the first input signal transmitted by the microcontroller 408 on the first line 410 can instruct the current source 402 as to the amount of the current $I_1$ to transmit.

Figure 5A:
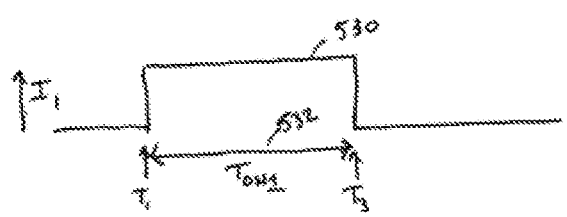
FIG. 5A is a pulse timing diagram in accordance with disclosed embodiments.
Figure 5B:
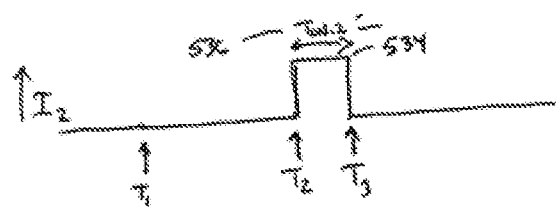
FIG. 5B is a pulse timing diagram in accordance with disclosed embodiments.

FIGS. 5A and 5B are pulse timing diagrams in accordance with disclosed embodiments and show how the current $I_1$ output from the first LED 404 and a current $I_2$ output from the second LED 412 can be illustrated in waveforms.

As seen in FIG. 5A, at time $T_1$, the microcontroller 408 can instruct the current source 406 to transmit the current $I_1$ to the first LED 404, thereby activating and illuminating the first LED 404 at time $T_1$. However, at time $T_3$, the microcontroller 408 can instruct the current source 402 to cease transmitting the current $I_1$ to the first LED 404, thereby deactivating the first LED 404 at time $T_3$. In between time $T_1$ and time $T_3$, the current $I_1$ can have a peak voltage 530 and a pulse width $T_{on\_1}$ 532.

As seen in FIG. 5B, the current $I_2$ can be zero at time $T_1$ when the transistor 414 is deactivated and passing the current $I_1$ from the source of the transistor 414 to the drain of the transistor 414, thereby bypassing and preventing the current $I_1$ from reaching the second LED 412. However, at time $T_2$, the transistor 414 can be activated, thereby blocking the current $I_1$ from flowing from the source of the transistor 414 to the drain of the transistor 414, and thereby sending the current $I_1$ to the second LED 412 for illumination of the second LED 412. Then, at time $T_3$, when the microcontroller 408 ceases transmitting the first input signal on the first line 410, the current source 402 can cease transmitting the current $I_1$ to the second LED 412, thereby deactivating the second LED 412 at time $T_3$. In between time $T_2$ and time $T_3$, the current $I_2$ can have a peak voltage 534 and a pulse width $T_{on\_2}$ 536 such that the peak voltage 534 can be substantially equal to the peak voltage 530, but such that the pulse width ($T_{on\_2}$) 536 can be shorter than the pulse width ($T_{on\_1}$) 530. Accordingly, the microcontroller 408 can control a luminous intensity of the circuitry 400 via the transistor 414.

Figure 6:
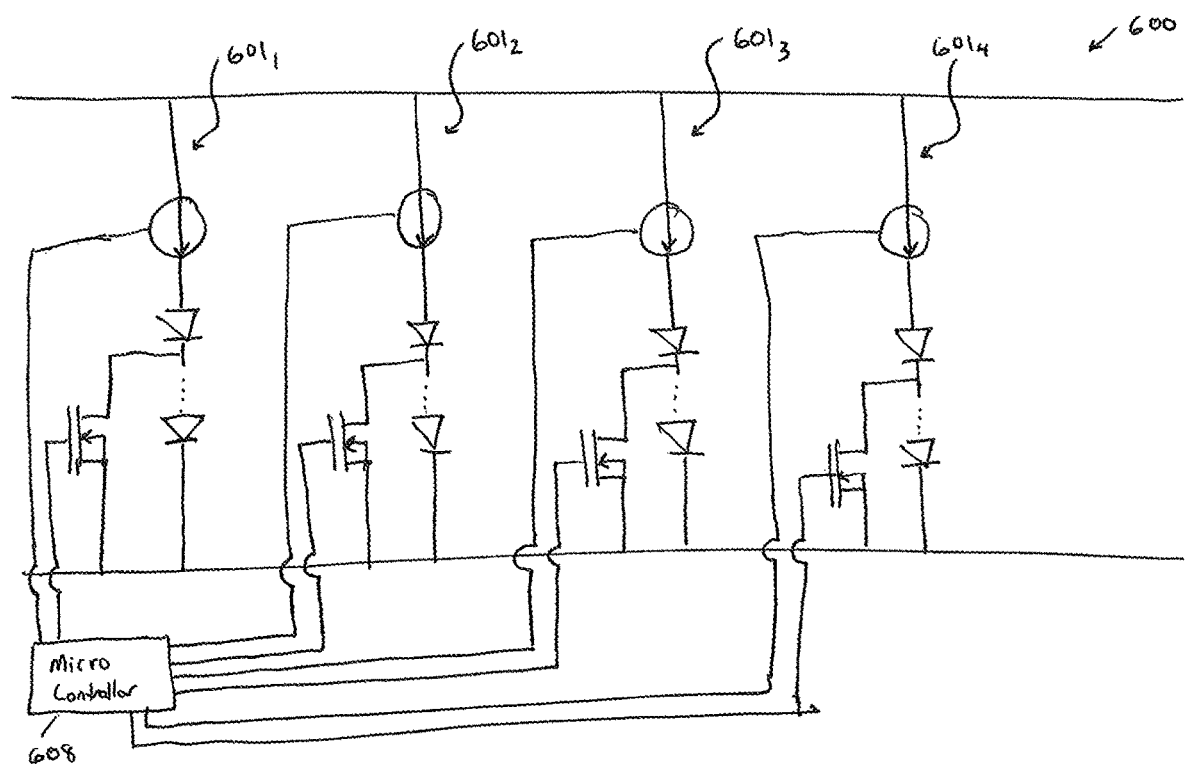
FIG. 6 is a circuit diagram of a visual alarm device in accordance with disclosed embodiments.

FIG. 6 is a circuit diagram of circuitry 600 of a visual alarm device in accordance with disclosed embodiments and represents a combination of the circuitry 200 of FIG. 2 and the circuitry 400 of FIG. 4. As seen in FIG. 6, the circuitry 600 can include a plurality of branches $601_1$, $601_2$, $601_3$, $601_4$, and each of the plurality of branches $601_1$, $601_2$, $601_3$, $601_4$ can be substantially similar to the circuitry 400. A microcontroller 608 can transmit a respective first input signal to control a respective current source in each of the plurality of branches $601_1$, $601_2$, $601_3$, $601_4$ and can transmit a respective second input signal to control a respective transistor in each of the plurality of branches $601_1$, $601_2$, $601_3$, $601_4$. The circuitry 600 can be flexible because the circuitry 600 can (1) vary a number of the plurality of branches $601_1$, $601_2$, $601_3$, $601_4$ that are activated by selectively instructing the respective current source in each of the plurality of branches $601_1$, $601_2$, $601_3$, $601_4$ to transmit respective current, (2) vary a respective amount of the respective current transmitted by the respective current source in each of the plurality of branches $601_1$, $601_2$, $601_3$, $601_4$, and (3) vary a respective number of LEDs activated in each of the plurality of branches $601_1$, $601_2$, $601_3$, $601_4$ by activating or deactivating the respective transistor in each of the plurality of branches $601_1$, $601_2$, $601_3$, $601_4$.

In accordance with the above, the circuitry 600 can efficiently illuminate a targeted area for both a wall mounted application and a ceiling mounted application. For example, in the ceiling mounted application, the circuitry 600 can provide rotational symmetry by activating all of the LEDs in all of the plurality of branches $601_1$, $601_2$, $601_3$, $601_4$. Alternatively, in the wall mounted application, the visual alarm device may not require visual output above a mounting height so the circuitry 600 can deactivate the LEDs in any of the plurality of branches $601_1$, $601_2$, $601_3$, $601_4$ located in a top half of the visual alarm device. Alternatively, in either the ceiling mounted application or the wall mounted application, the circuitry 600 can create or generate a cuboid shaped luminous intensity distribution by illuminating only some of the LEDs in a respective LED chain in each of the plurality of branches $601_1$, $601_2$, $601_3$, $601_4$.

Figure 7:
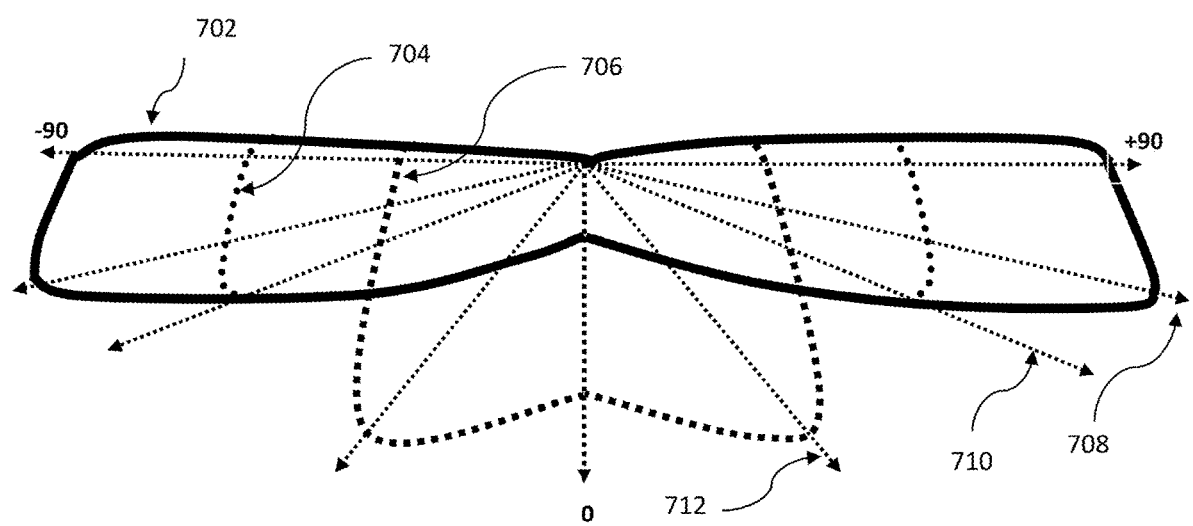
FIG. 7 is a polar diagram illustrating exemplary composite cross-sections of beams produced by a visual alarm device in accordance with disclosed embodiments.

As explained above, the circuitry 200, 400, 600 can selectively activate and deactivate LED chains or some LEDs in a single one of the LED chains to shape an intensity distribution for a visual alarm device into a defined part of a total required illumination volume. In this regard, FIG. 7 is a polar diagram illustrating exemplary composite cross-sections 702, 704, 706 of beams produced by the plurality of branches $601_1$, $601_2$, $601_3$, $601_4$ of FIG. 6. In accordance with disclosed embodiments, a vector summation of respective luminous intensities of each of the plurality of branches $601_1$, $601_2$, $601_3$, $601_4$ can form a respective overall shape of each of the composite cross-sections 702, 704, 706, and each of the plurality of branches $601_1$, $601_2$, $601_3$, $601_4$ can use respective power ratios to allow for beam steering.

For example, a first of the composite cross-sections 702 can have a first maximum output 708, which can correspond to an angle of approximately 70° and can be an optimum distribution for a ceiling-mounted visual alarm device conforming to EN54-23 having a 3 m height by 15 m diameter coverage area. As another example, a second of the composite cross-sections 704 can have a second maximum output 710, which can correspond to an angle of approximately 60° and can be an optimum distribution for a ceiling-mounted visual alarm device having a 3 m height by a 10 m diameter coverage area. As yet another example, a third of the composite cross-sections 706 can have a third maximum output 712, which can correspond to an angle of approximately 45° and can be an optimum distribution for a ceiling-mounted visual alarm device having a 3 m height by a 6 m diameter coverage area. In accordance with disclosed embodiments, each of the composite cross-sections 702, 704, 706 can be produced by activating a respective combination of some or all of the plurality of branches $601_1$, $601_2$, $601_3$, $601_4$, activating the respective transistor in some or all of the plurality of branches $601_1$, $601_2$, $601_3$, $601_4$, and controlling the respective amount of the respective current transmitted by the respective current source in each of the plurality of branches $601_1$, $601_2$, $601_3$, $601_4$.

Figure 8:
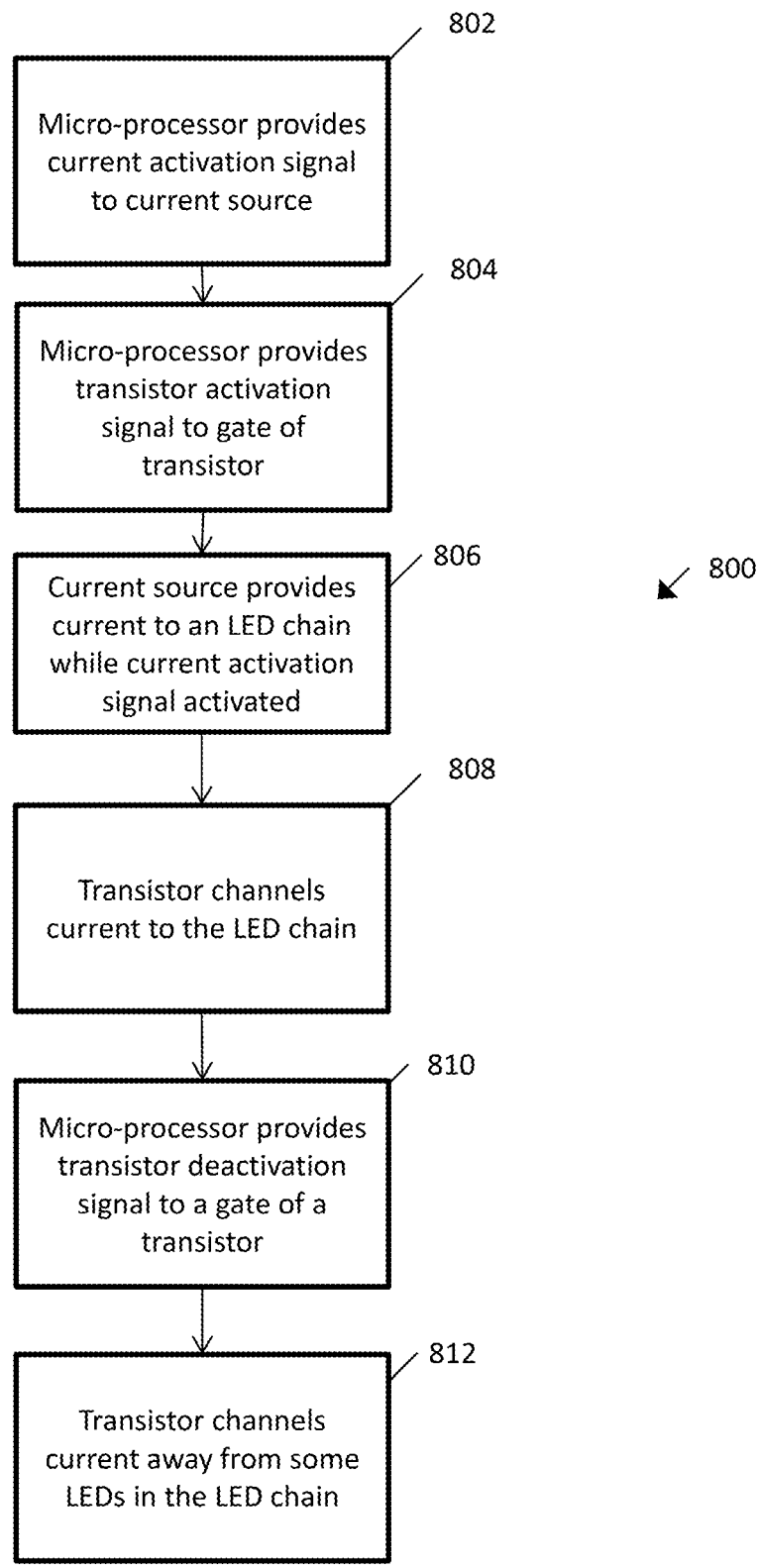
FIG. 8 is a flow diagram of a method in accordance with disclosed embodiments.

FIG. 8 is a method 800 of controlling illumination coverage of a visual alarm device in accordance with disclosed embodiments. As seen in FIG. 8, the method 800 can include a microcontroller (e.g. the microcontroller 408) transmitting a current activation signal to a current source (e.g. the current source 402) connected in series with an LED chain as in 802, the microcontroller transmitting a transistor activation signal to a gate of a transistor (e.g. the transistor 414), which can be connected in parallel with a subset of LEDs in the LED chain, as in 804, the current source transmitting current to the LED chain while receiving the current activation signal as in 806, and the transistor blocking the current from flowing from a source of the transistor to a drain of the transistor while receiving the transistor activation signal as in 808, thereby channeling the current through the subset of the LEDs in the LED chain. When the current source transmits the current to the LED chain as in 806, the LED chain can illuminate, and when the transistor blocks the current from flowing from the source of the transistor to the drain of the transistor as in 808, all of the LEDs in the LED chain can illuminate. In some embodiments, the current activation signal can include multiple bits that identify an amount of the current to provide to the LED chain, and in some embodiments, the microcontroller can transmit the current activation signal and the transistor activation signal concurrently.

As seen in FIG. 8, the method 800 can also include the microcontroller transmitting a transistor deactivation signal to the gate of the transistor as in 810 and the transistor channeling the current away from the subset of LEDs of the LED chain while receiving the transistor deactivation signal as in 812. When the transistor channels the current away from the subset of the LEDs in the LED chain as in 812, the subset of the LEDs in the LED chain may deactivate and cease to illuminate.

Figure 9:
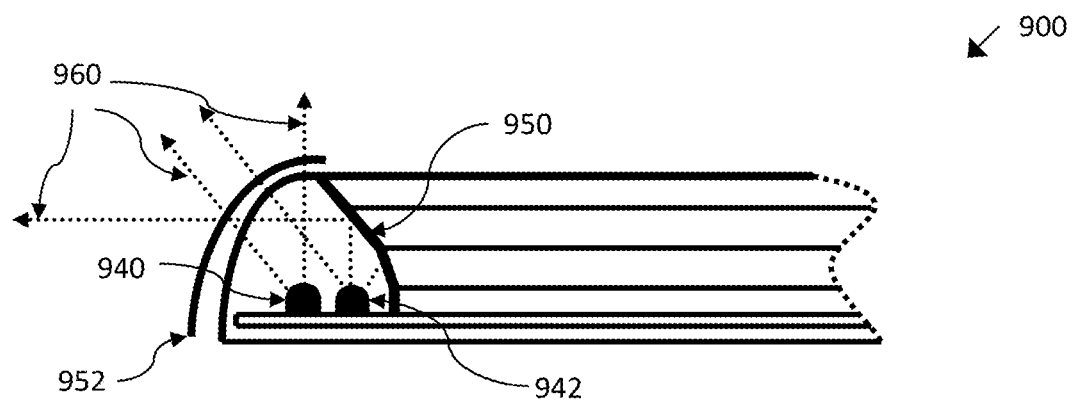
FIG. 9 is a cross-sectional view of a visual alarm device in accordance with disclosed embodiments.

FIG. 9 is a cross-sectional view a visual alarm device 900 in accordance with disclosed embodiments. The visual alarm device 900 can include a first LED chain 940, a second LED chain 942, a reflector 950 used as an optic with a freeform surface, and a lens cover 952. FIG. 9 illustrates each of the first LED chain 940 and the second LED chain 942 as a single LED for illustration purposes, but it is to be understood that each of the first LED chain 940 and the second LED chain 942 can include a plurality of LEDs, which can be evenly distributed in a circular array to form rotational symmetry. It is also to be understood that each of the first LED chain 940 and the second LED chain 942 can be connected to circuitry, such as the circuitry 200, the circuitry 400, or the circuitry 600, and that the visual alarm device 900 can include more than two LED chains, for example, between the first LED chain 940 and the second LED chain 942, to provide more composite illumination pattern control than is provided with the two LED chains.

In some embodiments, the reflector 950 and the lens cover 952 can shape outputs 960 of the first LED chain 940 and outputs of the second LED chain 942. For example, if the first LED chain 940 is located further from the reflector 950 than the second LED chain 942 and more of the second LED chain 942 is covered by the reflector 950 than the first LED chain 940, then most of the output 960 of the second LED chain 942 can have a larger deviation angle (e.g. 70°-90°) than the output 960 of the first LED chain 940. Alternatively, if the first LED chain 940 is located further from the reflector 950 than the second LED chain 942 and the first LED chain 940 is less covered by the reflector 950 than the second LED chain 942, then more of the output 960 of the first LED chain 940 is directed over a smaller deviation angle (e.g. 0°-45°) than the output 960 of the second LED chain 942. As such, the reflector 950 can shape light distribution of the visual alarm device 900.

In some embodiments, a composite illumination shape produced by a freeform surface of an optic is determined based on signals transmitted by a processor. In some embodiments, the respective signals can be adjustable pulse signals to vary an adjustable current provided to respective LED chains (e.g. the first LED chain 940 and the second LED chain 950). For example, the processor can transmit the first signal to a first LED chain so that the freeform surface of the optic can produce a first cylindrical illumination shape that can have an adjustable intensity. Furthermore, the processor can transmit a second signal to a second LED chain so that the freeform surface can produce an adjustable illumination that can be combined with the first cylindrical illumination shape to form a different composite cylindrical illumination shape. Further still, the processor can adjust the composite cylindrical illumination shape to have independent height and diameter adjustment by controlling a ratio of the current flowing to the first and second LED chains. Further still, the processor can control a third adjustable current source connected to a third LED chain so that an additional adjustable illumination distribution at an intermediate range of angles can combine with the composite cylindrical illumination shape.

According to an exemplary embodiment, a cylindrical illumination shape can be adjusted by varying the luminous intensity of each LED chain so that the combined illuminous distribution can be made optimal for a particular room size. Additionally the illumination shape can be modified so that, while it has a rotational symmetry, it may not be a cylindrical shape to better fit with different standards for a ceiling mounted strobe.

In some embodiments, varying the current in each LED chain and varying the current in individual LEDs of each LED chain can change the illumination shape from an adjustable cylindrical shape to an adjustable cuboid shape so that the visual alarm device can be optimized for ceiling or wall mounting. In addition the cuboid shape may be modified to fit with requirements of different wall mounted strobes.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A visual alarm device comprising:
a transceiver to receive an activation message indicating that at least one sensor that monitors a protected area for threats has been activated;
a processor that activates a notification component based on receipt of the activation message;
a measuring device that measures a volume of a room in which the visual alarm device is mounted and provides the volume to the processor, wherein the volume information is used to define a composite illumination shape; and
the notification component including:
a first circuitry branch that includes a first light emitting diode (LED) connected in series with a first current source;
a second circuitry branch that includes a second LED connected in series with a second current source; and
wherein the processor transmits a first signal to the first current source to instruct the first current source to transmit first current to and illuminate the first LED,
wherein the processor transmits a second signal to the second current source to instruct the second current source to transmit second current to and illuminate the second LED, and
wherein the composite illumination shape is determined based on the first and second signals transmitted by the processor.

2. The visual alarm device of claim 1 wherein the first circuitry branch and the second circuitry branch are connected in parallel.

3. The visual alarm device of claim 1 wherein the first circuitry branch includes a third LED connected in series with the first LED and the first current source.

4. The visual alarm device of claim 3 wherein the second circuitry branch includes a fourth LED connected in series with the second LED and the second current source.

5. The visual alarm device of claim 4 wherein the first circuitry branch includes a first transistor connected in parallel with the third LED.

6. The visual alarm device of claim 5 wherein the processor transmits a third signal to a gate of the first transistor to selectively illuminate the third LED based on a digital value of the third signal.

7. The visual alarm device of claim 6 wherein the second circuitry branch includes a second transistor connected in parallel with the fourth LED.

8. The visual alarm device of claim 7 wherein the processor transmits a four signal to a gate of the second transistor to selectively illuminate the fourth LED based on a digital value of the fourth signal.

9. The visual alarm device of claim 1 wherein the first signal identifies an amount of the first current for the first current source to transmit.

10. The visual alarm device of claim 1 wherein the first LED and the second LED illuminate synchronously.

11. The visual alarm device of claim 1 further comprising: a reflector.

12. The visual alarm device of claim 11 wherein the first LED is positioned further form the reflector than the second LED.

13. The visual alarms device of claim 12 wherein a deviation angle of light output by the second LED is larger than a deviation angle of light output by the first LED.

14. The visual alarm device of claim 1 wherein the first LED includes a plurality of LEDs evenly distributed in a circle to form rotational symmetry of light output by the plurality of LEDs.

15. The visual alarm device of claim 1 wherein the processor determines whether to transmit on or both of the first signal and the second signal based on the volume.

16. A method comprising
receiving an activation message indicating that at least one sensor that monitors a protected area for threats has been activated;
activating a notification component based on receipt of the activation message;
measuring, via a measuring device, a volume of a room in which the visual alarm device is mounted and providing the volume to a processor, wherein the volume information is used to define a composite illumination shape; and
the notification component including:
the processor transmitting a first signal to a current source;
the processor transmitting a second signal to a gate of a transistor;
responsive to receiving the first signal, the current source transmitting current to a plurality of light emitting diodes (LEDs) connected in series with the current source; and
responsive to receiving the second signal, the transistor blocking the current from flowing form a source of the transistor to a drain of the transistor, thereby channeling the current to a subset of the plurality of LEDs connected in parallel with the transistor to create the composite illumination shape.

17. The method of claim 16 further comprising:
the processor ceasing transmission of the second signal to the gate of the transistor; and
responsive to failing to receive the second signal, the transistor to the drain of the transistor, thereby channeling the current away from the subset of the plurality of LEDs connected in parallel with the transistor.

18. The method of claim 16 wherein the first signal identifies and amount of the current for the current source to transmit.

19. The method of claim 16 further comprising:
the processor transmitting the first signal and the second signal concurrently.

* * * * *